US010943151B2

(12) United States Patent
Eno et al.

(10) Patent No.: US 10,943,151 B2
(45) Date of Patent: Mar. 9, 2021

(54) SYSTEMS AND METHODS FOR TRAINING AND VALIDATING A COMPUTER VISION MODEL FOR GEOSPATIAL IMAGERY

(71) Applicant: Verizon Patent and Licensing Inc., Basking Ridge, NJ (US)

(72) Inventors: Joshua Eno, Denver, CO (US); Lindy Williams, Broomfield, CO (US); Wesley Boyer, Denver, CO (US); Kevin Brackney, Westminster, CO (US); Bergen Davell, Wheat Ridge, CO (US); Khoa Truong Pham, Centennial, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 104 days.

(21) Appl. No.: 16/147,470

(22) Filed: Sep. 28, 2018

(65) Prior Publication Data
US 2020/0104646 A1 Apr. 2, 2020

(51) Int. Cl.
*G06K 9/62* (2006.01)
*G06K 9/32* (2006.01)
*G06T 17/05* (2011.01)
*G06F 3/0482* (2013.01)
*G06N 20/00* (2019.01)

(52) U.S. Cl.
CPC ......... *G06K 9/6263* (2013.01); *G06F 3/0482* (2013.01); *G06K 9/3241* (2013.01); *G06N 20/00* (2019.01); *G06T 17/05* (2013.01)

(58) Field of Classification Search
CPC ..... G06T 17/05; G09K 9/3241; G09K 9/6263
See application file for complete search history.

(56) References Cited

U.S. PATENT DOCUMENTS

| 8,913,083 | B1 * | 12/2014 | Ogale | G06F 3/0481 |
| | | | | 345/632 |
| 9,792,368 | B1 * | 10/2017 | Amacker | G06F 16/9535 |
| 10,026,180 | B1 * | 7/2018 | Gu | G06T 7/73 |
| 10,460,168 | B1 * | 10/2019 | Boyer | G06F 16/29 |
| 2007/0110338 | A1 * | 5/2007 | Snavely | G06F 3/04842 |
| | | | | 382/305 |
| 2012/0008865 | A1 * | 1/2012 | Wu | G06K 9/3258 |
| | | | | 382/182 |
| 2012/0069233 | A1 * | 3/2012 | Nonaka | H04N 1/00244 |
| | | | | 348/333.02 |

(Continued)

*Primary Examiner* — Wen W Huang

(57) ABSTRACT

An exemplary geospatial image processing system generates, based on multiple detections of an object of interest detected by a computer vision model in multiple, correlated images of a geospatial location captured from different camera viewpoints, user interface content that includes a visual indication of the detected object of interest superimposed at an object position on a view of the geospatial location. The system provides the user interface content for display in a graphical user interface view of a user interface and provides, by way of the user interface, a user interface tool configured to facilitate user validation of one or more of the multiple detections of the object of interest. The system may receive, a user validation of one or more of the multiple detections of the object of interest and may train the computer vision model based on the user validation. Corresponding methods and systems are also disclosed.

20 Claims, 13 Drawing Sheets

(56) References Cited

U.S. PATENT DOCUMENTS

| | | | |
|---|---|---|---|
| 2012/0070071 A1* | 3/2012 | Rankin | G06K 9/00805 |
| | | | 382/154 |
| 2012/0262552 A1* | 10/2012 | Zhang | H04N 21/25841 |
| | | | 348/47 |
| 2014/0002439 A1* | 1/2014 | Lynch | G06T 11/00 |
| | | | 345/419 |
| 2015/0338234 A1* | 11/2015 | Seastrom | G01C 21/3679 |
| | | | 701/409 |
| 2017/0154241 A1* | 6/2017 | Shambik | B60R 11/04 |
| 2019/0102626 A1* | 4/2019 | Sakamoto | G06K 9/00671 |

* cited by examiner

SYSTEMS AND METHODS FOR TRAINING AND VALIDATING A COMPUTER VISION MODEL FOR GEOSPATIAL IMAGERY

BACKGROUND INFORMATION

Computer vision technologies are useful for identifying objects of interest depicted in geospatial imagery such as satellite, street-level, and community-sourced images of real-world geospatial locations. However, state-of-the-art computer vision technologies are not completely accurate in identifying objects of interest, which introduces a level of error and uncertainty that is difficult to correct. For example, state-of-the-art computer vision technologies mis-identify some objects as objects of interest (i.e., false positive identifications), fail to identify some actual objects of interest (i.e., false negative identifications), mis-identify boundaries of detected objects of interest, and/or mis-identify attributes of detected objects of interest.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
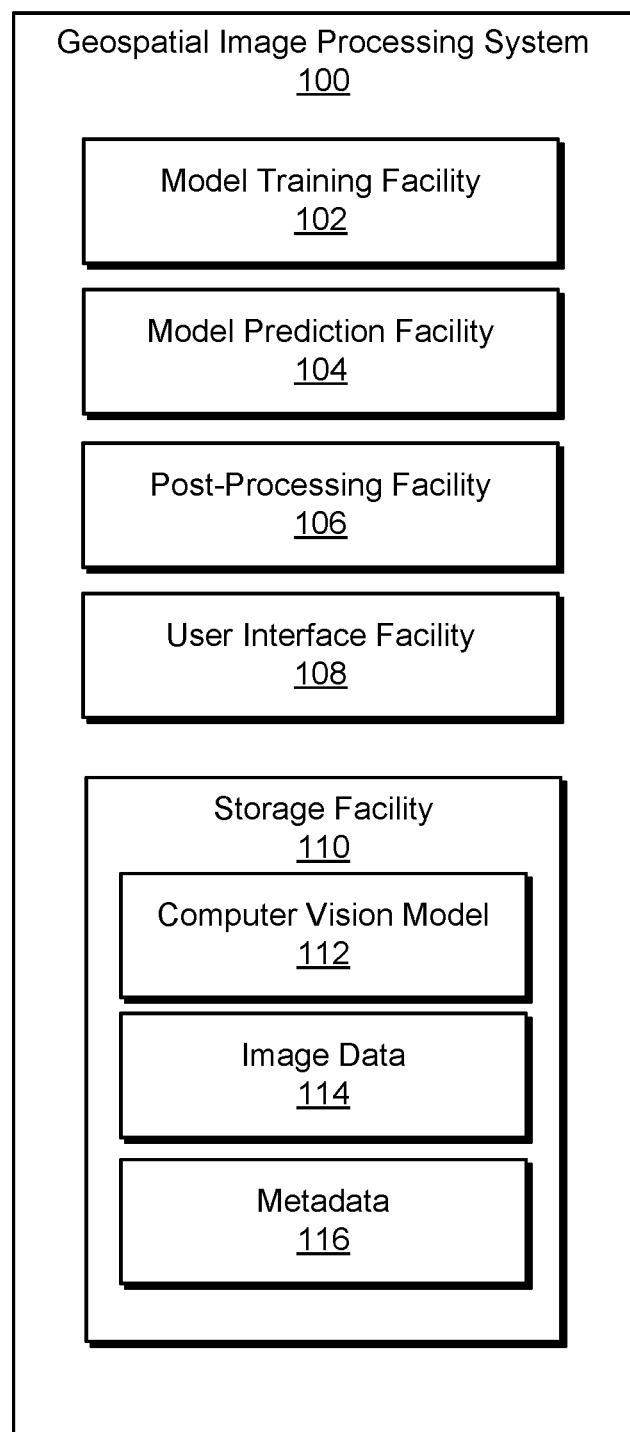
FIG. 1 illustrates an exemplary geospatial image processing system according to principles described herein.

Systems and methods for training and validating a computer vision model for geospatial imagery are described herein. In certain examples, a geospatial image processing system provides a user interface that includes user interface content displayed in a graphical user interface view and one or more user interface tools configured to facilitate user tagging of geospatial imagery and/or user validation of computer vision model detections of objects of interest in geospatial imagery. By way of the user interface tool(s), the geospatial image processing system receives user tags and/or user validations. The geospatial image processing system uses the received user tags and/or user validations to update metadata associated with geospatial imagery and to train a computer vision model based on the geospatial imagery and the updated metadata associated with the geospatial imagery.

Systems and methods described herein for training and validating a computer vision model for geospatial imagery provide various advantages, benefits, and improvements in comparison to conventional computer vision technologies for detecting objects of interest in geospatial imagery. For example, systems and methods described herein provide a user interface that facilitates robust and/or comprehensive 1) user tagging of objects of interest across multiple images of a geospatial location and/or 2) user validation of a correlated set of computer vision model detections across multiple, correlated images of a geospatial location. In certain examples, the user interface may include a graphical user interface view in which user interface content represents multiple computer vision model detections of an object of interest in multiple, correlated geospatial images captured from different camera viewpoints merged into a single display screen to provide a useful object-centric view of the geospatial location. In certain examples, such a user interface facilitates user validation of an entire image processing pipeline, including validation of detections by a computer vision model and validation of post-processing operations performed on the detections to correlate the detections and check for consistencies and/or inconsistencies across multiple geospatial images (e.g., to ensure a consistent view of the geospatial location). In this or a similar manner, systems and methods described herein may facilitate convenient, comprehensive, and/or intuitive user tagging of geospatial imagery and/or user validation of computer vision model detections of objects of interest in geospatial imagery.

Systems and methods described herein utilize user tags and/or user validations to train a computer vision model such that the computer vision model becomes more accurate and/or reliable at detecting objects of interest in geospatial imagery. Systems and methods described herein may thus provide, by way of an interactive user interface, a feedback loop for continual training of the computer vision model based on user tags and user validations. The resulting improved accuracy and/or reliability of the trained computer vision model may help reduce or even eliminate a level of error and uncertainty that exist with conventional computer vision technologies for detecting objects of interest in geospatial imagery.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary geospatial image processing system 100 ("system 100"). As shown, system 100 may include, without limitation, a model training facility 102, a model prediction facility 104, a post-processing facility 106, a user interface facility 108, and a storage facility 110 selectively and communicatively coupled to one another. It will be recognized that although facilities 102 through 110 are shown to be separate facilities in FIG. 1, facilities 102 through 110 may be combined into fewer facilities, such as into a single facility, or divided into more facilities as may serve a particular implementation. In some examples, facilities 102 through 110 may be distributed between multiple devices and/or multiple locations as may serve a particular implementation. Additionally, one or more of facilities 102 through 110 may be omitted from system 100 in certain implementations, while additional facilities may be included within system 100 in the same or other implementations.

Each of facilities 102 through 110 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility or may be implemented using shared computing components. Each of facilities 102 through 110 will now be described in more detail.

Storage facility 110 may store and maintain any data used by facilities 102 through 108 (and/or any other facilities included within system 100 not explicitly shown) to perform any of the operations described herein. For example, storage facility 110 may include program instructions for performing the operations described herein, as well as data received, generated, managed, maintained, used, and/or transmitted by facilities 102 through 108 as may serve a particular implementation. In some examples, for instance, storage facility 110 may include data representative of a computer vision model 112, image data 114 representing a set of images, and metadata 116 associated with the images.

Computer vision model 112 may include any type or implementation of a machine learning computer vision model for detecting one or more objects of interest in geospatial imagery. For instance, the computer vision model may include a neural network having an input layer, any suitable number of hidden layers, and an output layer. The neural network may be a convolutional neural network, a residual convolutional neural network, or any other suitable neural network. In other implementations, computer vision model 112 may include any other suitable machine learning model configured or configurable to detect one or more objects of interest in geospatial imagery.

Computer vision model 112 may be trained to detect depictions of any suitable object or objects of interest in geospatial imagery. Examples of such objects of interest include, but are not limited to, traffic lights, street signs, crosswalks, buildings, trees, vehicle parking spaces, parking meters, business signs, building addresses, doorways, handicap ramps, billboards, and poles (e.g., street-lamp poles, utility poles, decorative poles, etc.).

Image data 114 may represent geospatial imagery, which may include one or more images of a real-world geospatial location. A real-world geospatial location may include any real-world space associated with a geographic location. Images of the geospatial location may include satellite view images, street-level images, and/or any other image views of the geospatial location. For example, a set of images of a geospatial location may include one or more satellite images of the geospatial location and/or one or more street-level images of the geospatial location. A set of street-level images of the geospatial location may include images captured from different camera viewpoints relative to the geospatial location (e.g., different camera viewpoints having different camera locations and/or orientations).

Metadata 116 may include any information associated with geospatial imagery represented by image data 114. For example, metadata 116 may specify information about camera location and orientation from which geospatial imagery is captured. Metadata 116 may further include information descriptive of computer vision model detections of objects of interest in geospatial imagery, such as information specifying pixel locations of detections in images, geospatial locations of detections, confidence levels of detections, attributes assigned to detected objects of interest (e.g., height, width, distance from camera, material of composition, classification, etc. for a detected object of interest), and/or any other information associated with detected objects of interest. Metadata 116 may further include data representative of user tags associated with images, such as tags applied to images for training and/or validating computer vision model 112. Metadata 116 may further include data representative of user validations of computer vision model detections of objects of interest in geospatial imagery.

Model training facility 102 may be configured to train a computer vision model, such as computer vision model 112, to detect depictions of an object of interest in geospatial imagery. For example, model training facility 102 may execute a training session to train a computer vision model capable of machine learning. The training session may be performed in any suitable way, including by model training facility 102 submitting one or more sets of training images to the computer vision model for supervised machine learning by the computer vision model, such that the computer vision model learns to detect one or more objects of interest depicted in geospatial imagery. To illustrate, model training facility 102 may submit, to the computer vision model, a set of geospatial images in which depictions of an object of interest such as a traffic light have been tagged. The computer vision model may use the set of geospatial images to learn features associated with tagged depictions of objects and to configure the computer vision model to detect such features in order to identify traffic lights in other geospatial imagery.

Model training facility 102 may be configured to train a machine learning computer vision model in any suitable way. For example, model training facility 102 may train the computer vision model starting from scratch using tagged training images and/or may further train the computer vision model using additional training images. In some examples, transfer learning may be used to train the computer vision model such as by initially training the model on a public data set and then performing further training on annotated geospatial imagery that matches geospatial imagery that the model will be used on.

Model prediction facility 104 may be configured to execute runtime operation of a computer vision model, such as computer vision model 112, to detect depictions of an object of interest in geospatial imagery. For example, model prediction facility 102 may submit a set of geospatial images to the computer vision model, which may process the geospatial images to detect depictions of the object on interest in the geospatial images. If the computer vision model has been trained to detect depictions of traffic lights, for instance, the computer vision model may process the set of geospatial images to detect depictions of traffic lights in the images. The computer vision model may detect objects of interest depicted in the geospatial images in any suitable way and using any suitable form of geospatial images as input to the computer vision model. For example, the set of geospatial images submitted to the computer vision model may include full images or portions of the images that have been identified, by a pre-processing operation, as segments of images that are of interest (e.g., slices of images that may include objects of interest). In other examples, the input to the computer vision model may be in other suitable forms, such as feature vectors indicating features of geospatial images or portions of geospatial images.

The computer vision model may output data representative of a set of detections of objects of interest depicted in the geospatial images. The output may be in any suitable form, including a set of candidate detections and confidence scores respectively associated with the candidate detections.

Post-processing facility 106 may be configured to perform one or more operations on the outputs of the computer vision model in order to identify and filter out potentially false detections by the computer vision model. For example, post-processing facility 106 may filter out potentially false detections based on confidence levels of detections, correlation of images of a geospatial location, correlation of one or more attributes of detections across multiple images, correlation of detections with information from external data sources (e.g., data sources other than the images and/or metadata for the images), reasonableness factors, and/or any other suitable filter criteria.

Post-processing facility 106 may output data representative of a filtered set of detections of objects of interest depicted in the geospatial images. The output may be in any suitable form, including a filtered set of candidate detections and confidence levels respectively associated with the candidate detections.

User interface facility 108 may be configured to provide a user interface configured to facilitate training and/or validating a computer vision model such as computer vision model 112. The user interface may be accessible by way of a user computing device such that a user of the user computing device may interact with system 100 by way of the user interface. The interactions may include the user receiving user interface content and providing user input that may be used by system 100 to train and/or validate the computer vision model. To this end, user interface facility 108 may generate user interface content for presentation in the user interface, such as user interface content configured to be displayed in one or more graphical user interface views of the user interface. User interface facility 108 may further provide one or more user interface tools configured to facilitate reception of user input for training and/or validating the computer vision model.

In certain examples, user interface facility 108 may provide, by way of the user interface, a tagging tool configured to facilitate user tagging of geospatial imagery. User interface facility 108 may receive, by way of the tagging tool of the user interface, user input that tags one or more depictions of objects of interest in the geospatial imagery. System 100 may utilize the tagged depictions of the objects of interest to train the computer vision model to detect depictions of such objects of interest in other geospatial imagery.

In certain examples, user interface facility 108 may provide, by way of the user interface, a validation tool configured to facilitate user validation of detections of objects of interest detected by the computer vision model in geospatial imagery. User interface facility 108 may receive, by way of the validation tool of the user interface, user input validating (e.g., confirming or rejecting) one or more of the detections. System 100 may utilize the validated detections to further train the computer vision model, which may help improve the accuracy of future detections of objects of interest that may be made by the computer vision model in other geospatial imagery.

As mentioned, system 100 may provide an interactive feedback loop for training and validating the computer vision model. For example, user interface facility 108 may provide a user interface including a tagging tool that may be used by a user of a user computing device to tag geospatial imagery. User interface facility 108 may update metadata for the geospatial imagery based on the user tags. Model training facility 102 may perform one or more operations to train the computer vision model based on the geospatial imagery and the user tags represented in the updated metadata for the geospatial imagery.

After the computer vision model has been trained in this manner, model prediction facility 104 may execute runtime operation of the trained computer vision model to detect depictions of an object of interest in additional geospatial imagery (i.e., untagged geospatial imagery). For example, model prediction facility 104 may submit additional geospatial imagery to the trained computer vision model, which may process the geospatial imagery to detect depictions of the object of interest in the additional geospatial imagery.

User interface facility 108 may provide a user interface including a validation tool that may be used by the user to validate the computer vision model detections of the object of interest in the additional geospatial imagery. User interface facility 108 may update metadata for the additional geospatial imagery based on the validations. Model training facility 102 may perform one or more operations to further train the computer vision model based on the additional geospatial imagery and the user validations represented in the updated metadata for the additional geospatial imagery.

In this or a similar manner, system 100 may provide an interactive feedback loop for training and validating the computer vision model. The interactive feedback loop and/or corresponding user interfaces may facilitate convenient and/or intuitive training of the computer vision model, which may improve the accuracy and reliability of the computer vision model to make accurate detections of objects of interest depicted in geospatial imagery. Examples of training and validating a computer vision model, as well as user interfaces that facilitate training and validating the computer vision model will now be described in more detail.

Figure 2:
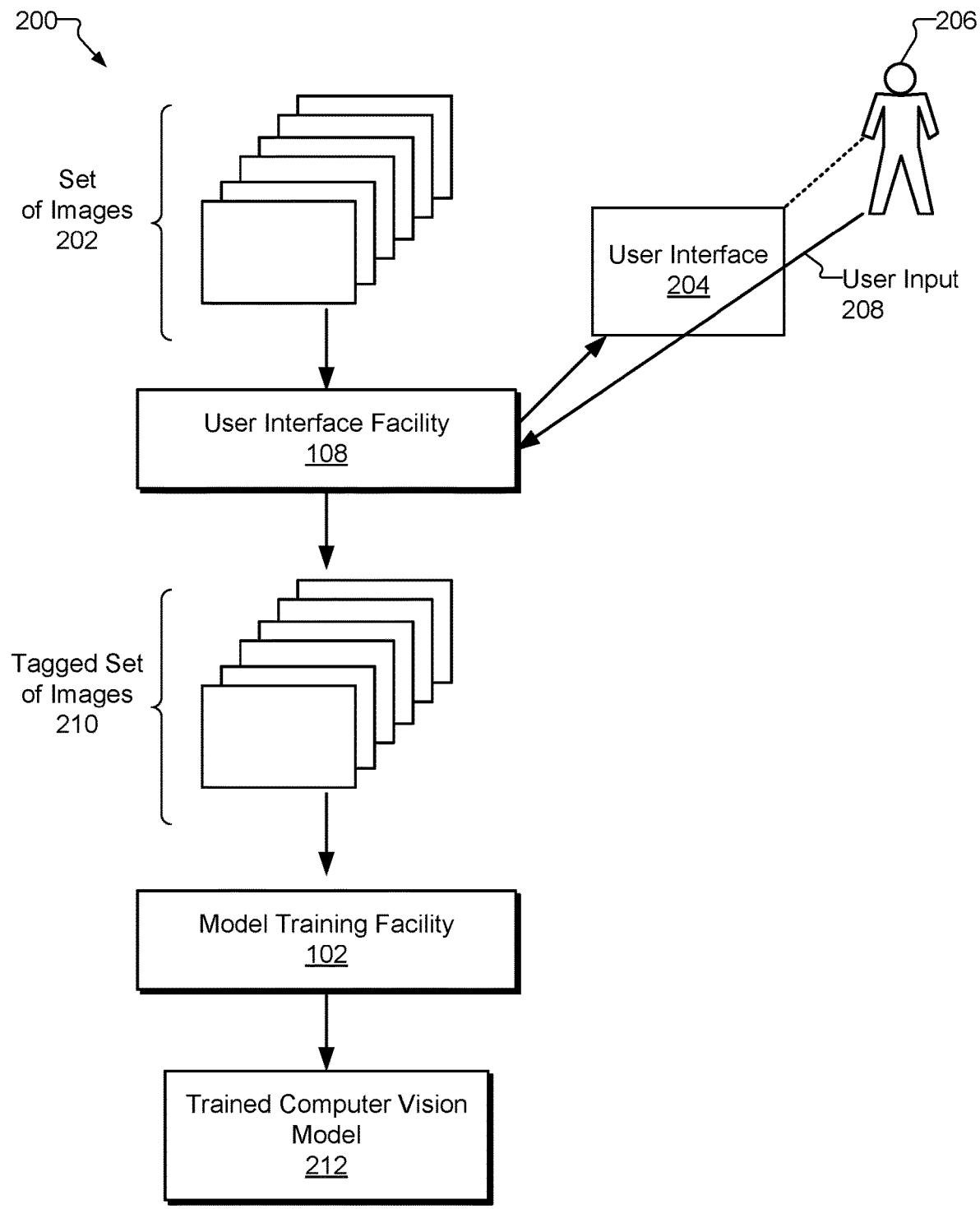
FIG. 2 illustrates an exemplary configuration for training a computer vision model according to principles described herein.

FIG. 2 illustrates an exemplary configuration 200 for training a computer vision model. As shown, user interface facility 108 accesses a set of images 202, which may be a set of images of a geospatial location (i.e., a set of geospatial images). User interface facility 108 uses the set of images 202 to generate user interface content for presentation in a user interface 204, which may be provided by user interface facility 108 to a user 206 (e.g., by providing user interface 204 to a user computing device (not shown) that presents user interface 204 to user 206). User interface 204 may include one or more graphical user interface views in which user interface content is displayed. The user interface content may include one or more of the images included in the set of images 202. For example, the user interface content may include a street-level image of the geospatial location.

Figure 3:
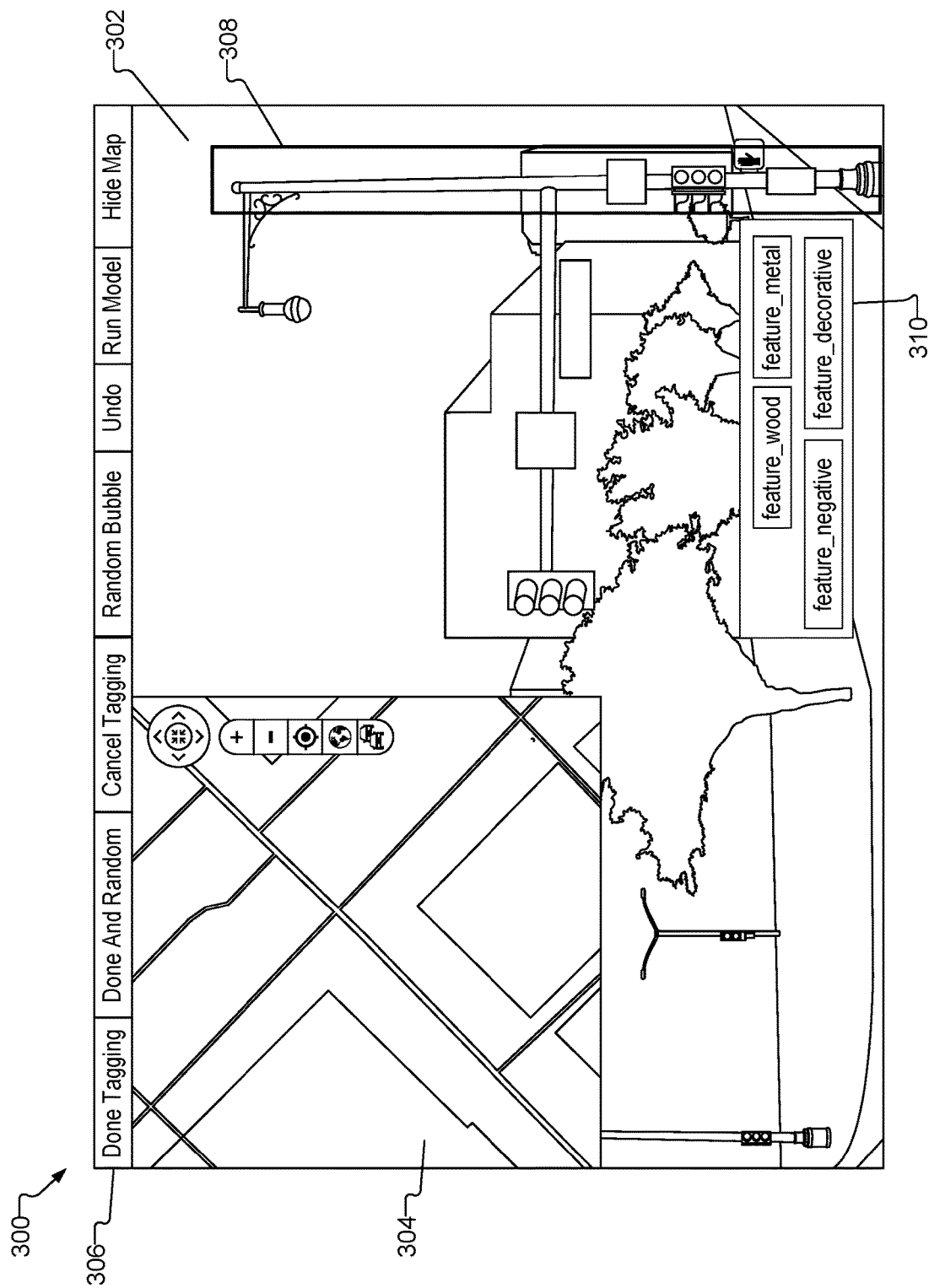
FIG. 3 illustrates an exemplary graphical user interface view according to principles described herein.

FIG. 3 illustrates an exemplary graphical user interface view 300 that may be displayed in user interface 204. As shown, graphical user interface view 300 may include a street-level image 302 of a geospatial location, a map view 304 of the geospatial location, and a menu 306 of user selectable options. Menu 306 may include any suitable options, including, for example, an option to finish tagging (a "done tagging" option), an option to finish tagging and display another image of a geospatial location randomly selected by user interface facility 108 (a "done and random" option), an option to cancel tagging without saving tags (a "cancel tagging" option), an option display another image of a geospatial location randomly selected by user interface facility 108 (a "random bubble" option), an option to undo a user input (e.g., to undo a tagging action), an option to run a computer vision model (a "run model" option), and an option to hide map view 304 from graphical user interface view 300 (a "hide map" option).

User interface 204 may include one or more tagging tools for use by a user to tag objects of interest depicted in street-level view 302 of the geospatial location. For example, user interface 204 may include an object marker tool that facilitates user 206 providing user input to draw a visual indicator to mark a pixel area within street-level image 302 in which an object of interest is depicted. For instance, user 206 may use the object marker tool to draw a bounding box 308 around an object of interest to mark a pixel area in which the object of interest is depicted. In FIG. 3, the object of interest is a street-lamp pole, and bounding box 308 has been drawn to mark a pixel area associated with the street-lamp pole (e.g., a pixel area containing the depiction of the street-lamp pole).

User interface facility 108 may be configured to use the marked pixel area to determine a geographic position of the marked object of interest. For example, user interface facility 108 may correlate the marked pixel area with other data, such as metadata for the set of images 202 (e.g., a position and/or orientation of a camera that captured street-level image 302), to derive a geographic position (e.g., latitude and longitude) associated with the pixel area and/or the marked object of interest. In this or any other suitable manner, the marked pixel area may define a position of the object of interest.

In response to receiving user input drawing bounding box 308, user interface facility 108 may provide an attribute assignment tool, in user interface 204, that facilitates user 206 tagging the object of interest with attributes. For example, user interface 204 may display a menu 310 of predefined attribute options that may be selected by user 206 to assign one or more attributes to bounding box 308. In FIG. 3, the menu 310 of attribute options includes an option to indicate that the object of interest is a wooden feature, a metal feature, a decorative feature, or not a feature. User 206 may select one or more of the attribute options to assign one or more attributes to bounding box 308, such as by selecting the "feature_metal" attribute option to indicate that the object of interest is a metal feature.

Returning to FIG. 2, user interface facility 108 may receive, by way of user interface 204, user input 208 indicative of user tags for the set of images 202. For example, user input 208 may include input provided by user 206 to user interface 204 to mark an object of interest (e.g., by drawing bounding box 308) and select one or more attributes to be assigned to bounding box 308.

User interface facility 108 may use the received user input 208 to apply user tags to the set of images 202 to generate a tagged set of images 210. User interface facility 108 may apply the user tags in any suitable way, including by updating metadata for the set of images 202 with data representative of the user tags such that the set of images 202 becomes the tagged set of images 210.

The tagged set of images 210 may be used by model training facility 102 to train a computer vision model, resulting in a trained computer vision model 212. For example, model training facility 102 may execute a training session in which the tagged set of images 210 are submitted, as training images, to a computer vision model that uses the user tags associated with the images for supervised learning of features indicative and/or features not indicative of an object of interest.

Figure 4:
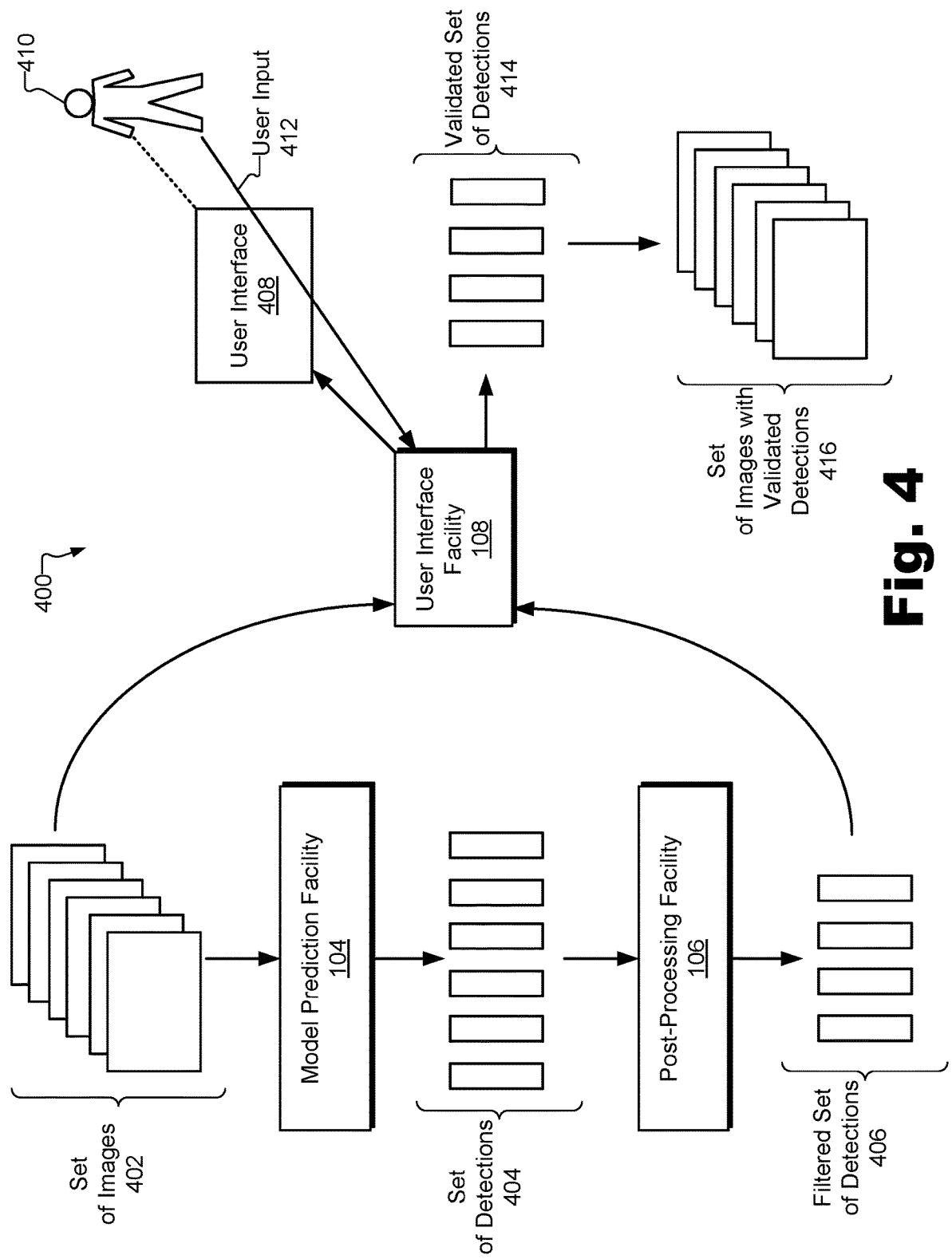
FIG. 4 illustrates an exemplary configuration for validating a computer vision model according to principles described herein.

FIG. 4 illustrates an exemplary configuration 400 for validating a computer vision model. As shown, model prediction facility 102 accesses a set of images 402, which may be a set of images of a geospatial location (i.e., a set of geospatial images). Model prediction facility 102 may submit the set of images 402 as input to a computer vision model, such as computer vision model 112 or 212, which may perform operations to detect (i.e., predict) objects of interest depicted in the set of images 402. Model prediction facility 102 may output a set of detections 404 representative of computer vision model detections of objects on interest in the set of images 402. The set of detections 404 may include any data representing such computer vision model detections, such as data indicating pixel and/or geographic positions of detected objects of interest, data indicating predicted attributes of the detected objects of interest, image data for portions of images in which objects of interest are detected, confidence scores for the detections, and/or any other data associated with detections of objects of interest. For example, if traffic lights are a defined object of interest, a detection of a candidate traffic light may include data indicating the position of a detected traffic light (e.g., a pixel position and/or a geographic position), data indicating one or more predicted attributes of the traffic light (e.g., has or does not have a turn-arrow signal), image data representing a portion of an image (e.g., an image slice) in which the traffic light is detected, a confidence score for the detection, and/or any other data about the detected traffic light.

Post-processing facility 106 accesses and performs post-processing operations on the set of detections 404. The post-processing operations may apply one or more filters to the set of detections 404, which filters may be defined to filter out potentially false detections of objects of interest by the computer vision model. For example, as mentioned above, post-processing facility 106 may filter out potentially false detections based on confidence levels of detections, correlation of images of a geospatial location, correlation of one or more attributes of detections across multiple images, correlation of detections with information from external data sources (e.g., data sources other than the images and/or metadata for the images), reasonableness factors, and/or any other suitable filter criteria.

In certain examples, post-processing facility 106 may correlate images of a geospatial location captured from different camera viewpoints. For example, the set of images 402 may include images of a geospatial location captured from different camera viewpoints, such as different street-level camera viewpoints. Post-processing facility 106 may correlate the set of images 402, which may include post-processing facility 106 correlating multiple detections of the same object of interest in the set of images 402. For example, a first image may include a first depiction of the object of interest from a first camera viewpoint, and a second image may include a second depiction of the object of interest from a second camera viewpoint. The set of detections 404 may include a first detection of the object of interest in the first image and a second detection of the object of interest in the second image. Post-processing facility 106 may use metadata for the set of images 402 and/or the set of detections 404 to correlate the first and second detections of the object of interest in the first and second images. For instance, based on the metadata, post-processing facility may determine congruency or similarity of determined attributes of the object of interest, such as a common geographic location (e.g., a common map location) of the object of interest in the first and second detections. This common geographic location may be determined by post-processing facility using triangulation and/or other suitable techniques to identity an intersection of lines extending from viewpoints of the first and second cameras to the determined geographic location of the object of interest in the first and second detections of the object of interest. Additional or alternative determined attributes of the object of interest may be used for correlating images and detections in other exemplar, including, but not limited to, determined heights, widths, sizes, types, and/or composition materials of the object of interest, such as by checking for consistency of such attributes across multiple detections and filtering out any detections that have been assigned anomalous attributes.

Thus, after post-processing facility 106 has performed post-processing operations, the set of images 402 and/or the set of detections 404 may be said to have been correlated. The correlation may be used to identify and filter out false detections at least by allowing post-processing facility 106 to use multiple, correlated images to identify anomalies and/or similarities in detections of an object of interest. Post-processing facility 106 may filter out or flag anomalous detections. For example, post-processing facility 106 may flag a set of detections of an object of interest that includes at least one detection that differs by at least a threshold from other detections (e.g., the height of a detected object of interest is significantly higher for one detection than for other detections of the object of interest).

Post-processing facility 106 may output data representative of a filtered set of detections 406 of objects of interest depicted in the set of images 402. The output may be in any suitable form, including a filtered set of candidate detections and confidence levels respectively associated with the candidate detections.

In certain examples, the filtered set of detections 406 may represent a set of detections of the same object of interest across multiple, correlated images of a geospatial location. In such a set of detections, each detection may correspond to a respective detected depiction of the object of interest in a respective image included in the set of images 402. Thus, each detection in the filtered set of detections 406 may correspond to a respective camera viewpoint from which the respective image was captured.

User interface facility 108 accesses and uses the correlated set of images 402 and the filtered set of detections 406 to generate user interface content for presentation in a user interface 408, which may be provided by user interface facility 108 to a user 410 (e.g., by providing user interface 408 to a user computing device (not shown) that presents user interface 408 to user 410). User interface 408 may include one or more graphical user interface views in which user interface content is displayed and one or mechanisms for receiving user input by way of the user interface.

The user interface content may include one or more of images of a geospatial location, such as a street-level image and/or a map view of the geospatial location, and one or more visual indications of detections of objects of interest (e.g., visual indications of detections included in the filtered set of detections 406). For example, the user interface content may include a visual indication of a detected object of interest superimposed at an object position on a view of the geospatial location, such as at a pixel position on a street-level image of the geospatial location and/or at a map position on a map view of the geospatial location. Examples of user interface content that may be presented in user interface 408 are described herein.

User interface 408 may further include one or more validation tools configured to facilitate user validation of one or more of the computer vision model detections of objects of interest in the set of images 402. For example, user interface 408 may include a validation tool configured to facilitate user validation of one or more detections included in the filtered set of detections 406.

User 410 may utilize validation tools to validate one or more of the detections of objects of interest in the set of images 402. For example, using the validation tools, user 410 may provide user input 412 indicating validations of one or more detections included in the filtered set of detections 406. In certain examples, the validations of the detections may indicate user confirmations and/or user rejections of the detections. Examples of validation tools that may be presented in user interface 408 and that facilitate user input 412 confirming or rejecting one or more detections of an object of interest are described herein.

User interface facility 108 may receive user input 412 indicating validations of computer vision model detections of objects of interest in the set of images 402. User interface facility 108 may use the validations to generate a validated set of detections 414, which may include data representative of confirmations and/or rejections of detections of objects of interest. For example, the validated set of detections 414 may be the filtered set of detections 406 with data (e.g., metadata) added thereto to indicate confirmations and/or rejections of one or more of the detections in the filtered set of detections 406.

User interface facility 108 may use the validated set of detections 414 to generate a set of images with validated detections 416, which may also be referred to as a "validated set of images." The validated set of images may include data representative of the validations of detections, such as metadata for the images that indicates the validations of the detections. For one detection of an object of interest in an image, for example, the validated set of images may include metadata indicating a user confirmation of the detection. For another detection of an object of interest in an image, for example, the validated set of images may include metadata indicating a user rejection of the detection.

Although FIG. 4 illustrates an exemplary implementation in which user interface facility 108 accesses and uses the filtered set of detections 406 to provide user interface 408, in other implementations, user interface facility 108 may additionally or alternatively access and use an unfiltered set of detections, such as the set of detections 404 that has not undergone post-processing operations.

Figure 5:
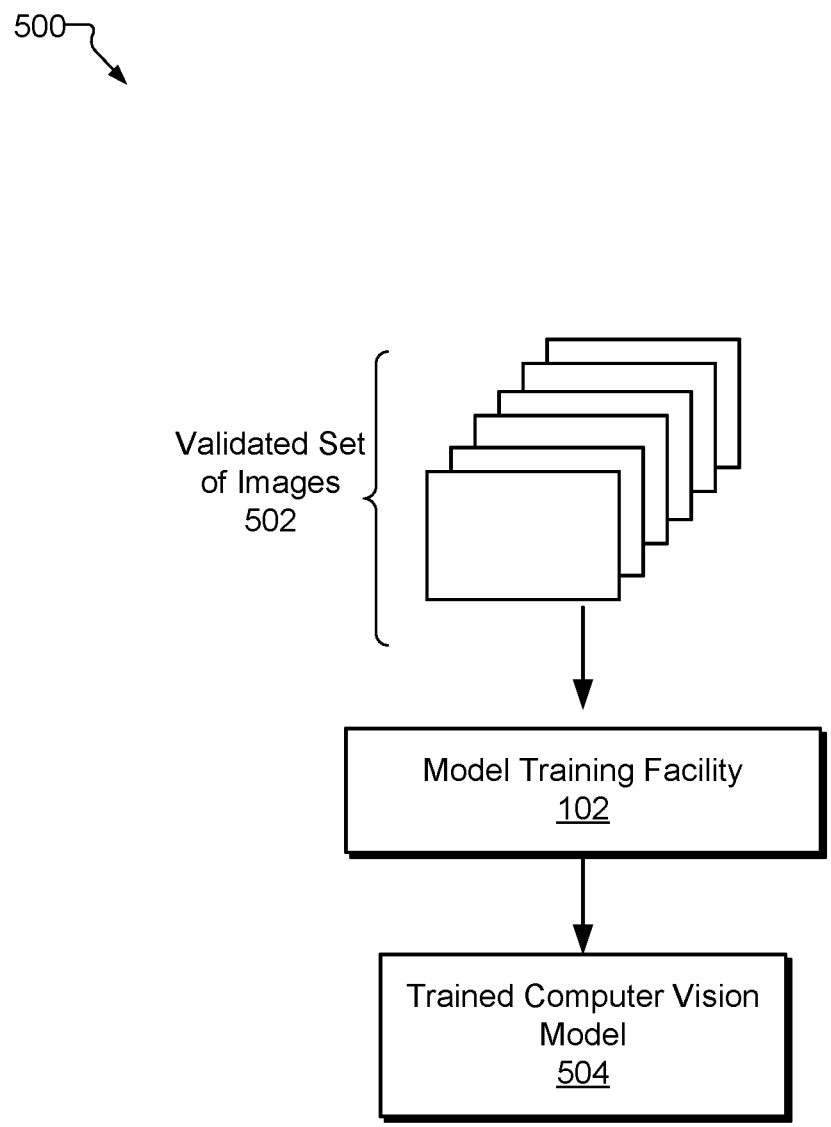
FIG. 5 illustrates an exemplary configuration for training a computer vision model based on validations of detections by a computer vision model according to principles described herein.

FIG. 5 illustrates an exemplary configuration 500 for training a computer vision model based on validations of computer vision model detections. As shown, model training facility 102 may access and use a validated set of images 502 (e.g., the set of images with validated detections 416) to train a computer vision model, resulting in a further trained computer vision model 504. For example, model training facility 102 may execute a training session in which the validated set of images 502 are submitted, as training images, to a computer vision model that uses the validated detections associated with the images for supervised learning of features indicative and/or features not indicative of an object of interest.

Examples of user interface content and user interface tools that may be provided in a user interface such as user interface 408 will now be described with reference to FIGS. 6-10.

Figure 6:
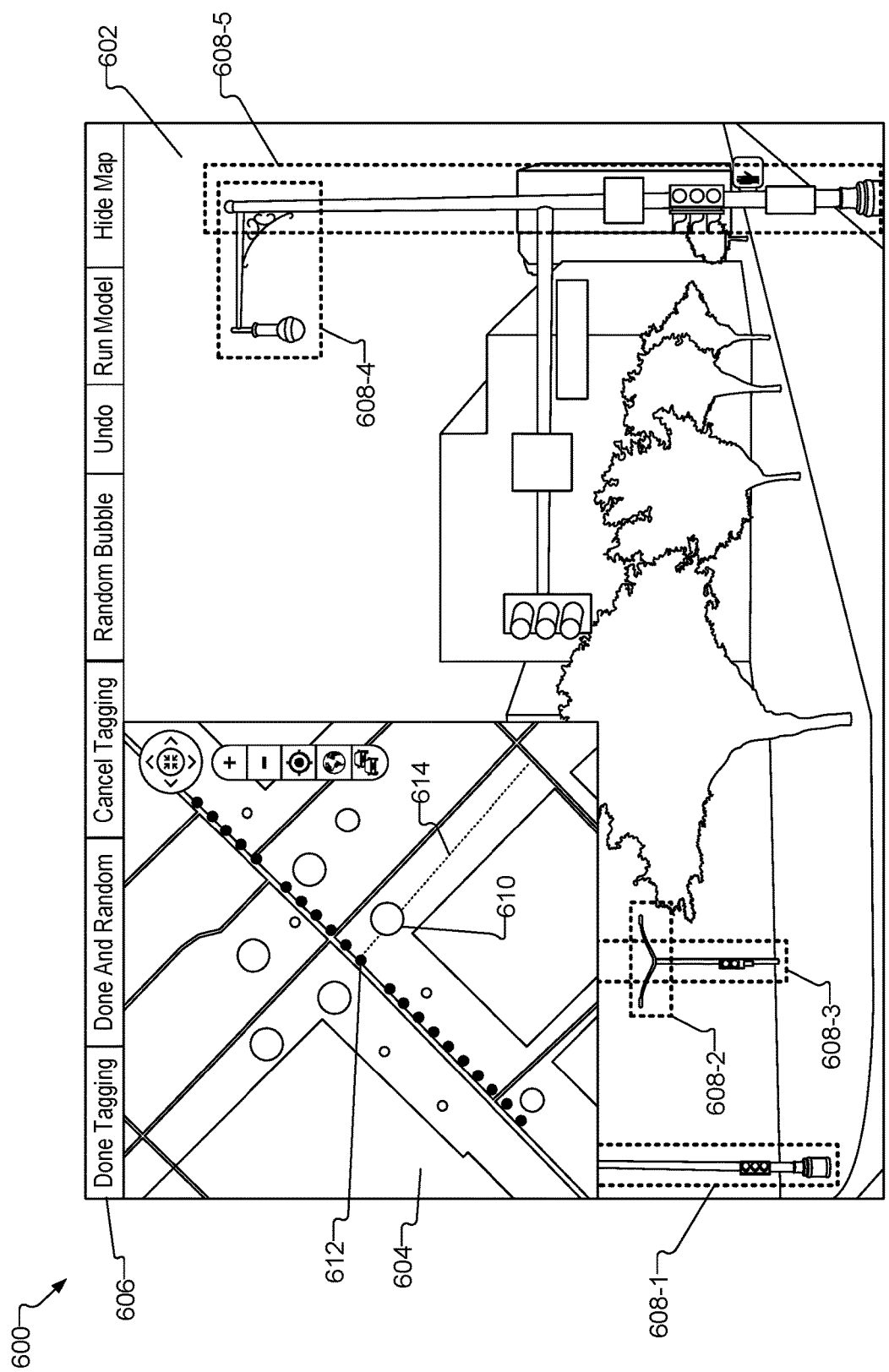
FIGS. 6-10 illustrate exemplary graphical user interface views according to principles described herein.

FIG. 6 illustrates an exemplary graphical user interface view 600 that may be displayed in user interface 408. As shown, graphical user interface view 600 may include a street-level image 602 of a geospatial location, a map view 604 of the geospatial location, and a menu 606 of user selectable options, which menu options may be the same menu options as described with reference to FIG. 3.

Graphical user interface view 600 further includes visual indications of computer vision model detections of objects of interest. Within street-level image 602, visual indications in the form of dashed-line bounding boxes 608 (e.g., bounding boxes 608-1 through 608-5) are superimposed at positions of detected objects of interest. For example, bounding box 608-5 is superimposed at an object position of a detected object of interest (e.g., at a pixel position of a detected street-lamp pole, such as a rectangular pixel area that contains the image depiction of the street-lamp pole).

The dashed lines of bounding boxes 608 may visually indicate that bounding boxes 608 represent computer vision model detections of objects of interest and not user-defined bounding boxes that may be drawn by a user to tag objects of interest. Bounding boxes 608 may visually indicate one or more detected attributes of the corresponding objects of interest. For example, the dashed lines of bounding boxes 608 may be color-coded to represent materials of composition of the objects of interest. For instance, the dashed lines of one bounding box may be brown to visually indicate an object of interest detected to be made of wood, and the dashed lines of another bounding box may be gray to visually indicate an object of interest detected to be made of metal.

Within map view 604, visual indications in the form of circle icons with white or no fill content, such as circle icon 610, are superimposed at positions of detected objects of interest. For example, circle icon 610 is superimposed at an object position of a detected object of interest (e.g., at a map position of a detected street-lamp pole). In certain examples, the circle icons such as circle icon 610 may visually represent attributes of detected objects of interest. For example, a size of such a circle icon may represent a predicted size of a detected object of interest. Accordingly, the different sizes of such circle icons in graphical user interface view 600 may represent different predicted sizes of the detected objects of interest.

With street-level image 602 and map view 604 displayed in graphical user interface view 600, both a detected pixel position and a detected map position of an object of interest may be concurrently indicated in graphical user interface view 600. For example, bounding box 608-5 may indicate a detected pixel position of a detected street-lamp pole, and circle icon 610 may indicate a detected map position of the detected street-lamp pole.

Map view 604 may further include visual indications of camera viewpoint positions from which street-level images (e.g., street-level images included in the set of images 402) were captured. For example, visual indications in the form of circle icons with black fill content, such as circle icon 612, are superimposed at camera viewpoint positions from which street-level images were captured. Circle icon 612 visually indicates a position of a camera from which street-level image 602 was captured. When street-level image 602 is displayed in graphical user interface view 600 as shown, map view 604 may further include a line 614 (shown as a dashed line in FIG. 6) visually indicating a camera orientation (e.g., a camera angle) from which street-level image 602 was captured. With circle icon 610, circle icon 612, and line 614 displayed in map view 604, a user viewing graphical user interface view 600 may readily ascertain a map or world viewpoint from which the displayed street-level image was captured.

Figure 7:
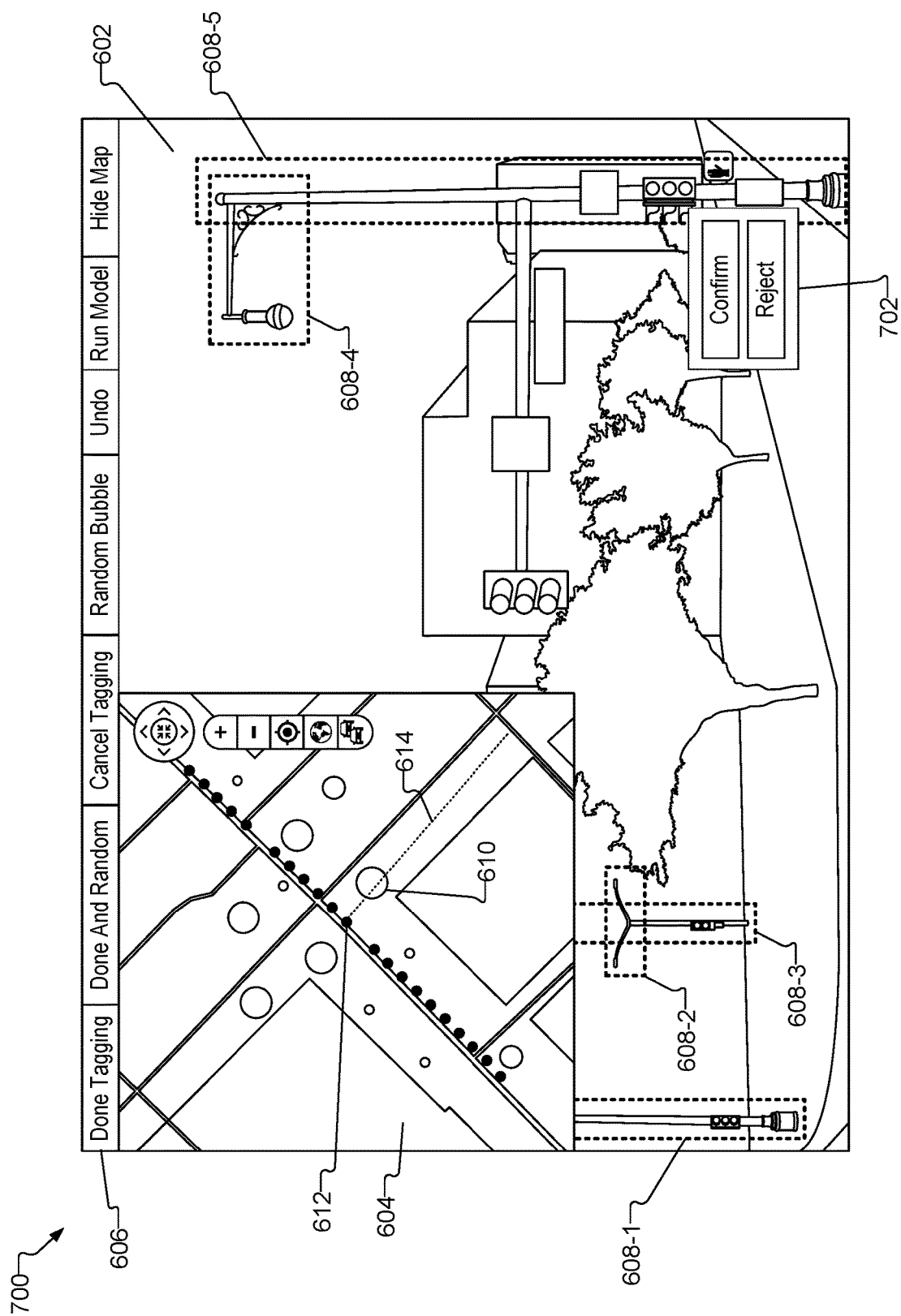

With graphical user interface view 600 displayed, a user may provide input to launch one or more validation tools that may be used by the user to validate one or more computer vision model detections, including one or more of the computer vision model detections visually represented in graphical user interface view 600. As an example, the user may provide input (e.g., by way of a click-input or touch-input handler) to select bounding box 608-5. In response, user interface facility 108 may display a validation tool that includes a menu of validation options. FIG. 7 illustrates a graphical user interface view 700 in which an exemplary menu 702 of validation options is displayed. Graphical user interface view 700 is the same as graphical user interface view 600 with the addition of the menu 702 of validation options.

As shown in FIG. 7, the menu 702 of validation options may include a confirmation option and a rejection option. The user may provide input to select the confirmation option to confirm the detection represented by bounding box 608-5 or the rejection option to reject the detection represented by bounding box 608-5. In response to user input selecting the confirmation option, user interface facility 108 may update metadata associated with a set of images and/or a set of detections to include data representing the user confirmation of the detection represented by bounding box 608-5. In response to user input selecting the rejection option, in some examples user interface facility 108 may update metadata associated with a set of images and/or a set of detections to include data representing the user rejection of the detection represented by bounding box 608-5. In other examples, user interface facility 108 may provide one or more validation tools for use by the user to reject only a portion of the detection by modifying one or more of the determined attributes of the detected object of interest. For example, user interface facility 108 may provide one or more tools for use by the user to modify a determined type, height, width, size, position, etc. of the object of interest. Such tools may allow the user to resize a bounding box, select a different type classification for an object of interest, and/or otherwise modify one or more determined attributes of the detected object of interest.

Figure 8:
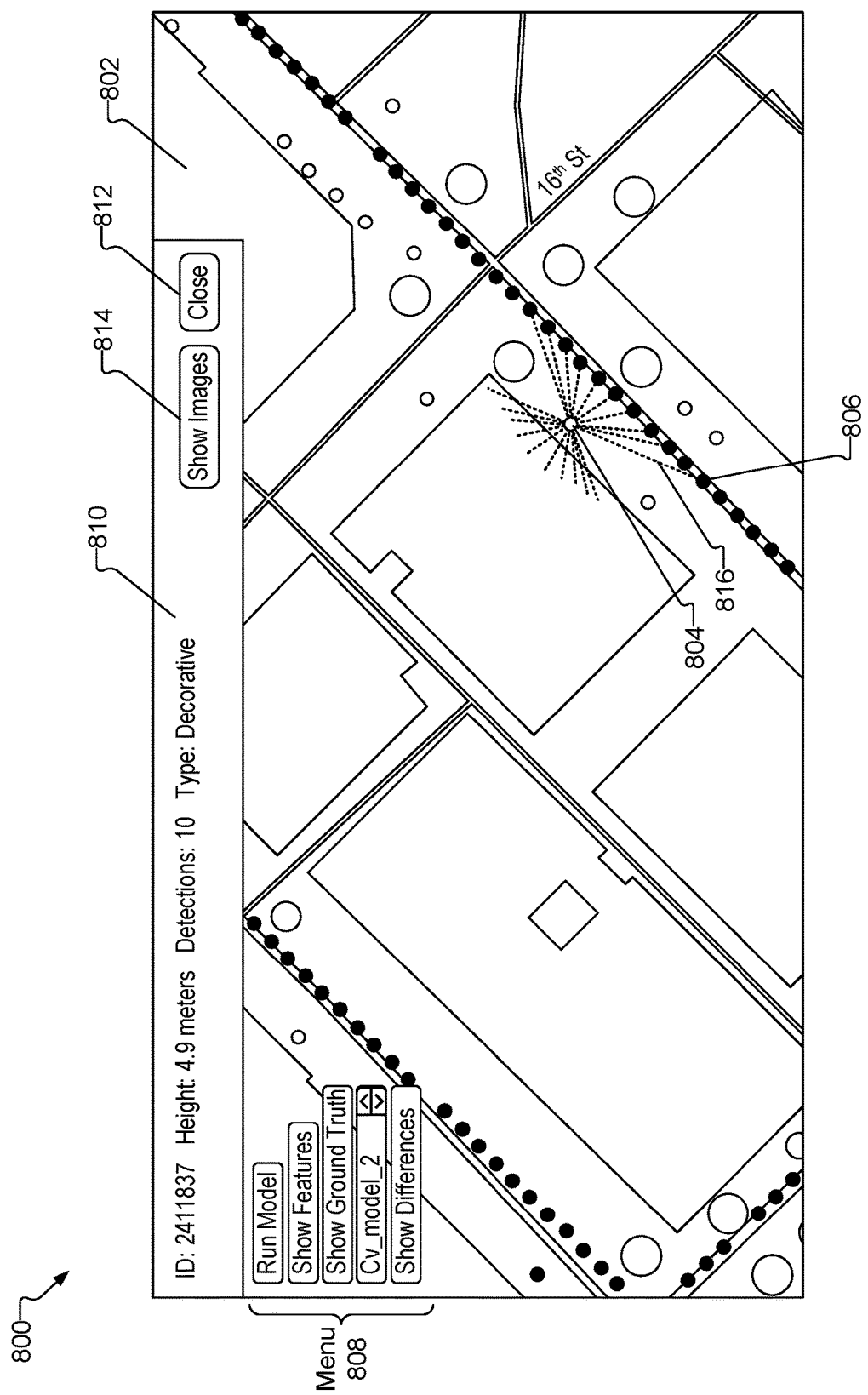

FIG. 8 illustrates another exemplary graphical user interface view 800 that may be displayed in user interface 408. As shown, graphical user interface view 800 includes a map view 802 of a geospatial location and visual indications of computer vision model detections of objects of interest superimposed on map view 802. As shown, the visual indications of the detections include circle icons with white or no fill content, such as circle icon 804, that are superimposed at positions of detected objects of interest. For example, circle icon 804 is superimposed at an object position of a detected object of interest. In certain examples, the circle icons such as circle icon 804 may visually represent attributes of detected objects of interest. For example, a size of a circle icon may represent a predicted size of a detected object of interest. Accordingly, the different sizes of the circle icons in graphical user interface view 800 may represent different predicted sizes of the detected objects of interest.

Map view 802 may further include visual indications of camera viewpoint positions from which street-level images (e.g., street-level images included in the set of images 402) were captured. For example, visual indications in the form of circle icons with black fill content, such as circle icon 806, are superimposed at camera viewpoint positions from which street-level images were captured. Circle icon 806 visually indicates a position of a camera from which a street-level image included in a set of images was captured.

Graphical user interface view 800 may further include a menu 808 of options for user selection to initiate performance of one or more operations of system 100. As shown, menu 808 may include various options associated with respective operations, such as an option to run a computer vision model, an option to display visual indications of detected features (e.g., detected objects of interest), in graphical user interface view 800, an option to display ground truth information (e.g., map information) in graphical user interface view 800, and option for selecting a particular computer vision model to run, and an option to show differences (e.g., differences between detections by two or more computer vision models).

Graphical user interface view 800 may further include a detections pane 810 in which user interface content and tools may be provided. In FIG. 8, detections pane 810 includes visual indications of determined attributes of a detected object of interest, such as a number of detections of the object of interest (e.g., ten detections of the object of interest in ten street-level images), a determined height of the object of interest (e.g., 4.9 meters), and a determined type of the object of interest (e.g., a decorative object). Detections pane 810 may further include user-selectable options such as an option 812 to close detections pane 810 and an option 814 to display images of the detected object of interest.

With graphical user interface view 800 or a similar graphical user interface view displayed (e.g., a graphical user interface view like graphical user interface view 800 but with detections pane 810 and orientation lines not displayed), a user may provide input to launch one or more validation tools that may be used by the user to validate one or more computer vision model detections, including one or more of the computer vision model detections visually represented in graphical user interface view 800. As an example, the user may provide input to select circle icon 804 representative of a detected object of interest. In response, user interface facility 108 may provide one or more validation tools configured to facilitate user validation of one or more of the detections of the object of interest. For example, user interface facility 108 may display detections pane 810 as shown in FIG. 8. As another example, user interface facility 108 may display orientation lines, such as orientation line 816, that visually indicate camera viewpoint orientations from which street-level images that include detected depictions of the object of interest were captured. For example, orientation line 816 indicates a camera orientation from a camera position indicated by circle icon 806 to the position of the object of interest indicated by circle icon 804. With such orientation lines displayed in graphical user interface view 800, a user viewing graphical user interface view 800 may readily ascertain from which camera positions and angles the object of interest was detected and from which camera positions and angles the object of interest was not detected by a computer vision model. In some examples, the orientation lines may indicate a determined intersection of multiple detections of the object of interest at the object position indicated in map view 802.

As a further example, the user may provide input to select the "show images" option 814 in detections pane 810. In response, user interface facility 108 may provide one or more validation tools configured to facilitate user validation of one or more of the detections of the object of interest. For example, user interface facility 108 may expand detections pane 810 and provide additional user interface content and/or tools in the expanded detections pane 810. In certain examples, the additional user interface content may include one or more street-level images of detected depictions of the object of interest. In the example illustrated in FIG. 8, for instance, an expanded detections pane may include images of the ten detections of the object of interest detected in ten street-level images captured from ten different camera positions.

In certain examples, the images displayed in the expanded detections pane may be image portions extracted from the street-level images of the geospatial location in which the object of interest is detected. For example, slices of street-level images that include the detected depictions of the object of interest may be extracted from the street-level images and displayed in the expanded detections pane.

Figure 9:
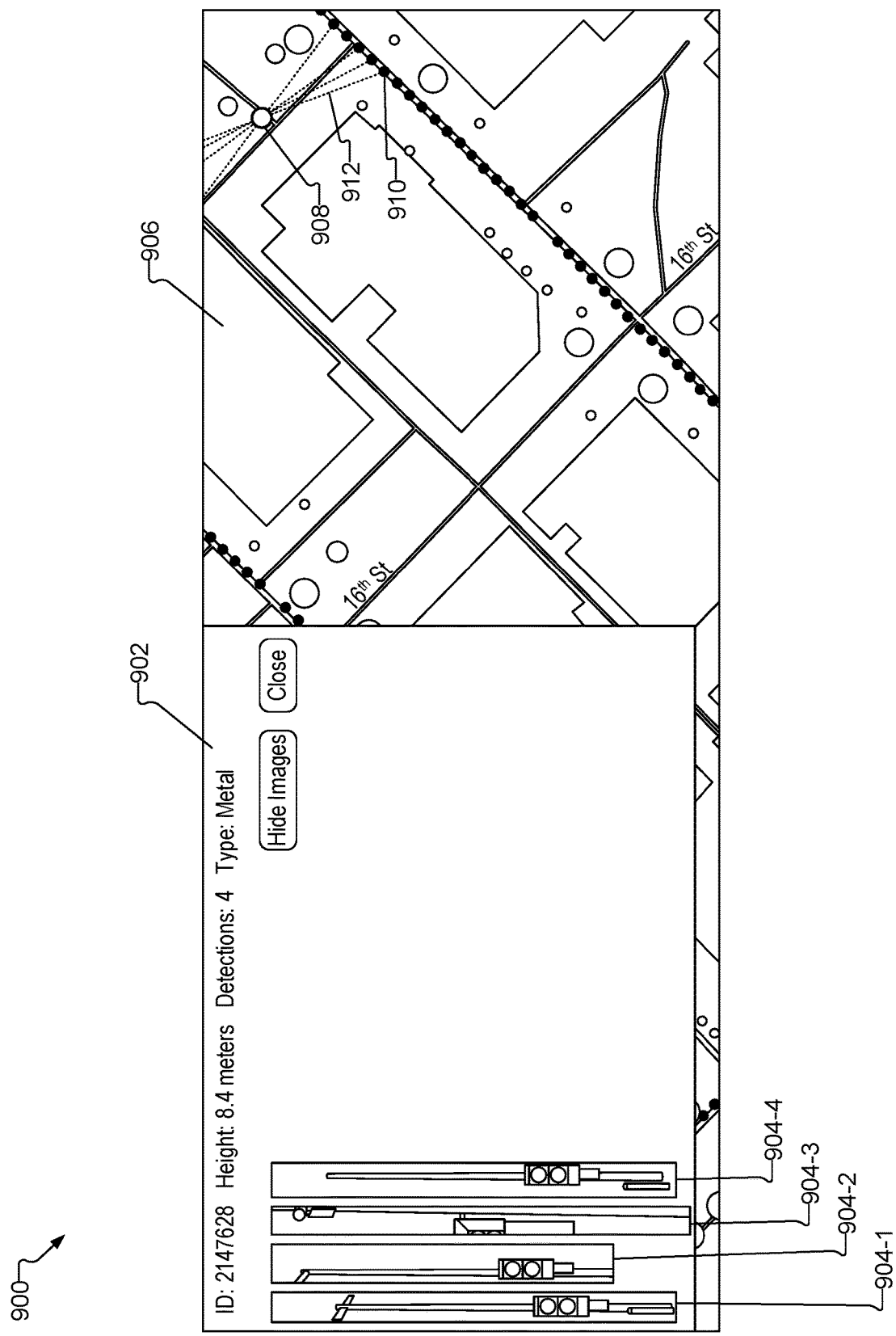

FIG. 9 illustrates a graphical user interface view 900 that includes an expanded detections pane 902 with image portions 904 (e.g., image portions 904-1 through 904-4) representing detections of an object of interest displayed therein. In the illustrated example, image portions 904 are image slices extracted from four street-level images in which depictions of an object of interest (e.g., a traffic light) are detected by a computer vision model. The image slices are portions of the images within which the object of interest is detected. For example, the image slices may correspond to pixel areas defined by bounding boxes assigned to detections of the object of interest.

Graphical user interface view 900 may further include a map view 906 on which visual indications of detections of objects of interest are superimposed. For example, circle icon 908 visually indicates detections of the object of interest depicted in image portions 904. In addition, visual indications of camera viewpoint positions from which street-level images were captured may be displayed on map view 906. For example, circle icon 910 visually indicates a camera viewpoint position from which a street-level image was captured and in which a depiction of the object of interest is detected. In addition, orientation lines, such as orientation line 912 may be displayed on map view 906 to visually indicate camera capture orientation relative to a map position of the detected object of interest.

With graphical user interface view 900 displayed, a user may provide input to launch one or more additional validation tools that may be used by the user to validate one or more computer vision model detections, including one or more of the computer vision model detections visually represented in graphical user interface view 900. As an example, the user may provide input to select one of the image portions 904, such as image portion 904-4. In response, user interface facility 108 may provide one or more validation tools configured to facilitate user validation of one or more of the detections of the object of interest. For example, user interface facility 108 may provide a validation tool that includes a menu of validation options, such as a menu that includes a confirmation option and a rejection option that may be selected by the user to confirm or reject the selected detection (e.g., the detection corresponding to image portion 904-4).

Figure 10:
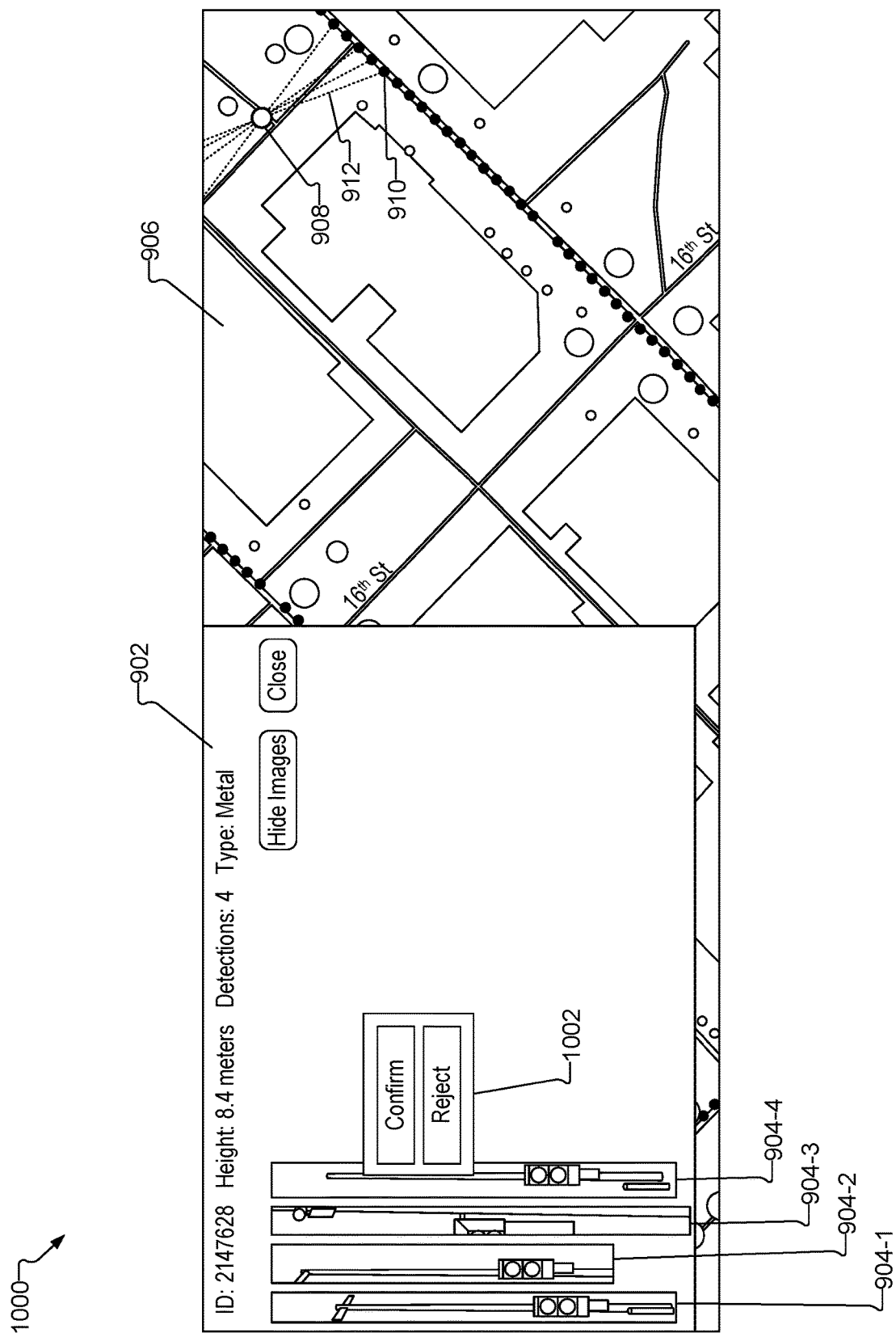

FIG. 10 illustrates a graphical user interface view 1000 in which an exemplary menu 1002 of validation options is displayed. Graphical user interface view 1000 is the same as graphical user interface view 900 with the addition of the menu 1002 of validation options. As shown in FIG. 10, the menu 1002 of validation options may include a confirmation option and a rejection option. The user may provide input to select the confirmation option to confirm the detection represented by image portion 904-4 or the rejection option to reject the detection represented by image portion 904-4. In response to user input selecting the confirmation option, user interface facility 108 may update metadata associated with a set of images and/or a set of detections to include data representing the user confirmation of the detection represented by image portion 904-4. In response to user input selecting the rejection option, in some examples user interface facility 108 may update metadata associated with a set of images and/or a set of detections to include data representing the user rejection of the detection represented by image portion 904-4. In other examples, user interface facility 108 may provide one or more additional validation tools for use by the user to reject only a portion of the detection by modifying one or more of the determined attributes of the detected object of interest. For example, user interface facility 108 may provide one or more tools for use by the user to modify a determined type, height, width, size, position, etc. of the object of interest. Such tools may allow the user to resize a bounding box, select a different type classification for an object of interest, and/or otherwise modify one or more determined attributes of the detected object of interest.

Menu 1002 of validation options is illustrative of one example of a validation tool that may be provided by user interface facility 108. User interface facility 108 may provide additional or alternative validation tools in other examples, such as a menu that includes additional or alternative validation options. For example, instead of presenting menu 1002 of validation options in graphical user interface view 1000 as shown in FIG. 10, user interface facility 108 may provide a menu that includes an option to confirm only the detection corresponding to the selected image portion 904-4, an option to reject only the detection corresponding to the selected image portion 904-4, an option to confirm all detections corresponding to all image portions displayed in expanded detections pane 902 (e.g., 904-1 through 904-4), and an option to reject all detections corresponding to all image portions displayed in expanded detections pane 902 (e.g., 904-1 through 904-4). Accordingly, the user may confirm or reject multiple, correlated detections with a selection of a single confirmation or rejection option.

While certain exemplary user inputs and validation tools have been described and illustrated herein, the described and illustrated examples are illustrative. Other suitable user inputs and validation tools may be supported and/or provided in other examples. For example, other suitable user input may be configured to launch a menu of validation options. For instance, a user selection of any visual indication (e.g., circle icon 908) of a detection of an object of interest may launch a menu of validation options.

In certain examples, a visual indication such as a circle icon representing a detected object of interest may be configured to visually indicate a potential inconsistency across multiple, correlated detections of the object of interest. For example, the circle icon may have a particular fill color indicative of such a potential discrepancy, which may help guide the user in choosing to validate the detected object of interest. To illustrate, one of the detections of the object of interest may be assigned a height attribute that is different from the height attributes assigned to other detections of the object of interest. Post-processing facility 106 may identify this inconsistency when correlating the detections of the object of interest. User interface facility 108 may detect the identified discrepancy (e.g., such as by detecting that a discrepancy flag has been set by post-processing facility 106) and display the circle icon representative of the detected object of interest with a fill color indicative of the potential discrepancy.

In certain examples, user interface facility 108 may generate and provide for display a graphical user interface view in which visual indications of detections of objects of interest are displayed for detections by multiple computer vision models. Such a display may provide a visual comparison of differences in detections across multiple computer vision models.

In certain examples, user interface facility 108 may provide one or more navigation tools for use by the user to navigate around geospatial locations to provide tag input and/or validate input for various images and/or views of the geospatial location. User interface facility 108 may provide a randomized navigation tool that randomly selects a next image, view, or detection associated with a geospatial location for presentation in a user interface. This randomization tool may help ensure that training samples are randomly distributed throughout a geospatial area of interest.

User interface facility 108 may provide any suitable control tools for use by the user to control operations of system 100. For example, user interface facility 108 may provide tools for selecting geospatial areas on which to run a computer vision model, tools for indicating availability of geospatial imagery, and tools for accessing geospatial imagery (e.g., by downloading from a source external to system 100).

Figure 11:
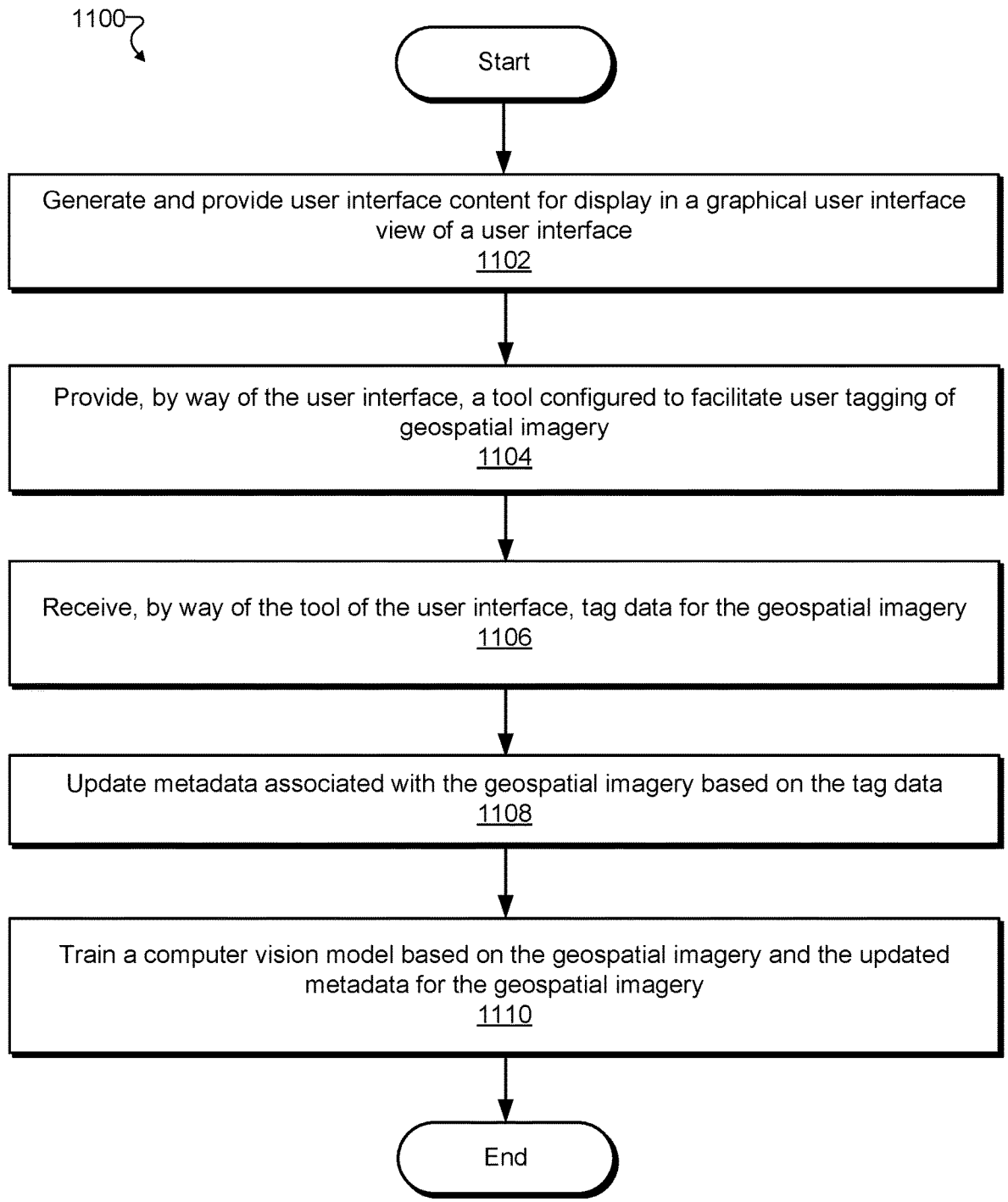
FIGS. 11-12 illustrate exemplary methods for training and validating a computer vision model for geospatial imagery according to principles described herein.
Figure 12:
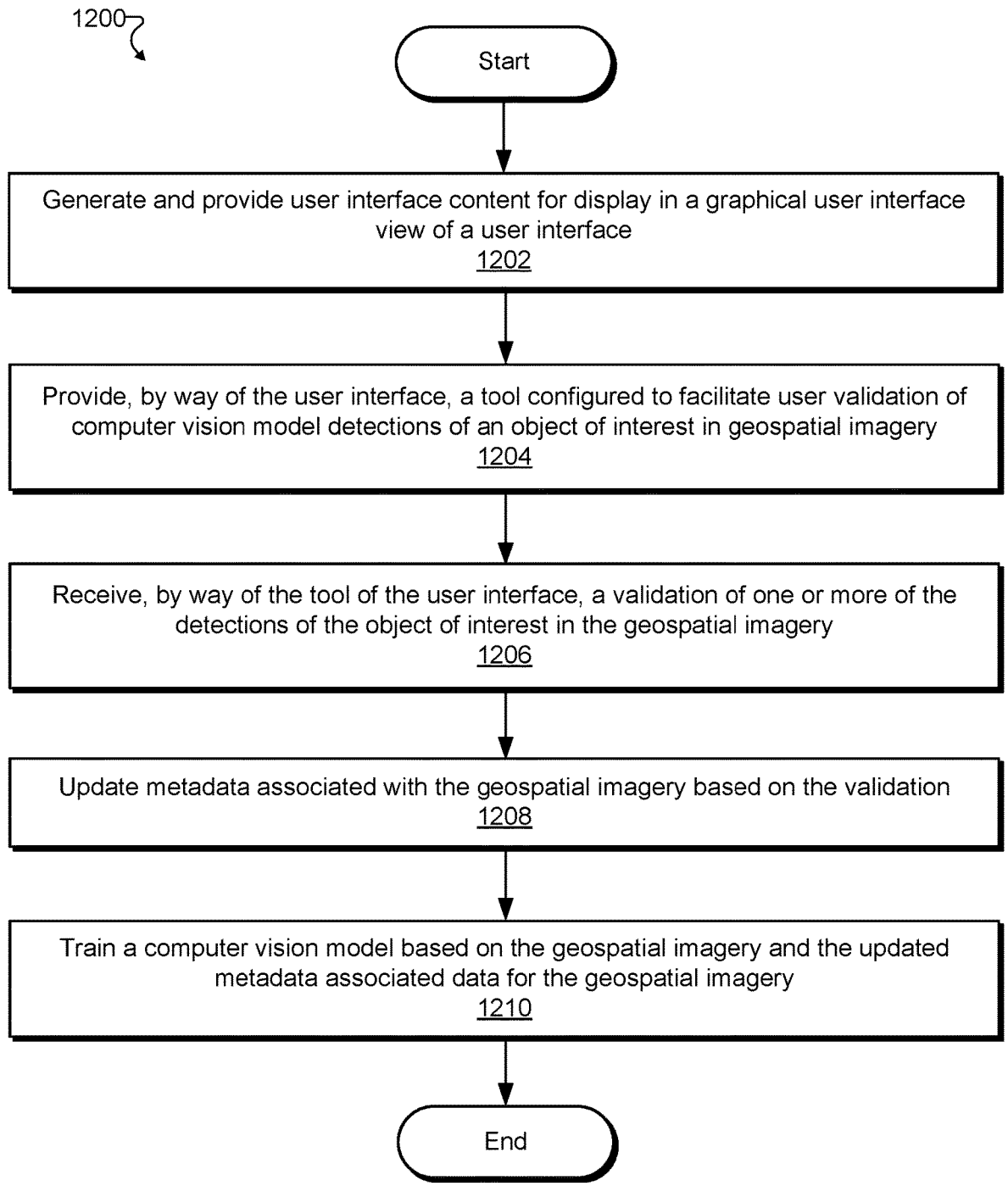

FIGS. 11-12 illustrate exemplary methods for training and validating a computer vision model for geospatial imagery. While FIGS. 11-12 illustrate exemplary operations according to one embodiment, other embodiments may omit, add to, reorder, and/or modify any of the operations shown in FIGS. 11-12. One or more of the operations shown in FIGS. 11-12 may be performed by system 100, any components included therein, and/or any implementation thereof.

Turning to method 1100 illustrated in FIG. 11, in operation 1102, a geospatial image processing system generates and provides user interface content for display in a graphical user interface view of a user interface. For example, the system may generate and provide graphical user interface view 300 for display. Operation 1102 may be performed in any of the ways described herein.

In operation 1104, the geospatial image processing system provides, by way of the user interface, a tool configured to facilitate user tagging of geospatial imagery. For example, the system may provide, in the user interface, a user interface tool such as any of the tagging tools described herein. Operation 1104 may be performed in any of the ways described herein.

In operation 1106, the geospatial image processing system receives, by way of the tool of the user interface, tag data for the geospatial imagery. The tag data, which may be received in suitable way, may represent one or more user tags of objects of interest in the geospatial imagery. Operation 1106 may be performed in any of the ways described herein.

In operation 1108, the geospatial image processing system updates metadata associated with the geospatial imagery based on the tag data. For example, the system may add data representative of one or more user tags of objects of interest to the metadata for the geospatial imagery. Operation 1108 may be performed in any of the ways described herein.

In operation 1110, the geospatial image processing system trains a computer vision model based on the geospatial imagery and the updated metadata for the geospatial imagery. Operation 1110 may be performed in any of the ways described herein.

Turning to method 1200 illustrated in FIG. 12, in operation 1202, a geospatial image processing system generates and provides user interface content for display in a graphical user interface view of a user interface. For example, the system may generate and provide any of graphical user interface views 600, 700, 800, 900, and 1000 for display. As described herein, the system may generate the user interface content based on multiple detections of an object of interest detected by a computer vision model in multiple, correlated images of a geospatial location captured from different camera viewpoints. The user interface content may include a visual indication of the detected object of interest superimposed at an object position on a view of the geospatial location. Operation 1202 may be performed in any of the ways described herein.

In operation 1204, the geospatial image processing system provides, by way of the user interface, a tool configured to facilitate user validation of one or more computer vision model detections of an object of interest in geospatial imagery. For example, the system may provide, in the user interface, a user interface tool such as any of the validation tools described herein. Operation 1204 may be performed in any of the ways described herein.

In operation 1206, the geospatial image processing system receives, by way of the user interface, a validation of one or more of the detections of the object of interest in the geospatial imagery. The validation, which may be received in suitable way, may represent a user validation of one or more computer vision model detections of the object of interest in the geospatial imagery. As described herein, the validation may include a confirmation or a rejection of one or more computer vision model detections of the object of interest in the geospatial imagery. Operation 1206 may be performed in any of the ways described herein.

In operation 1208, the geospatial image processing system updates metadata associated with the geospatial imagery based on the validation. For example, the system may add data representative of the validation to the metadata for the geospatial imagery. Operation 1208 may be performed in any of the ways described herein.

In operation 1210, the geospatial image processing system trains a computer vision model based on the geospatial imagery and the updated metadata for the geospatial imagery. Operation 1210 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
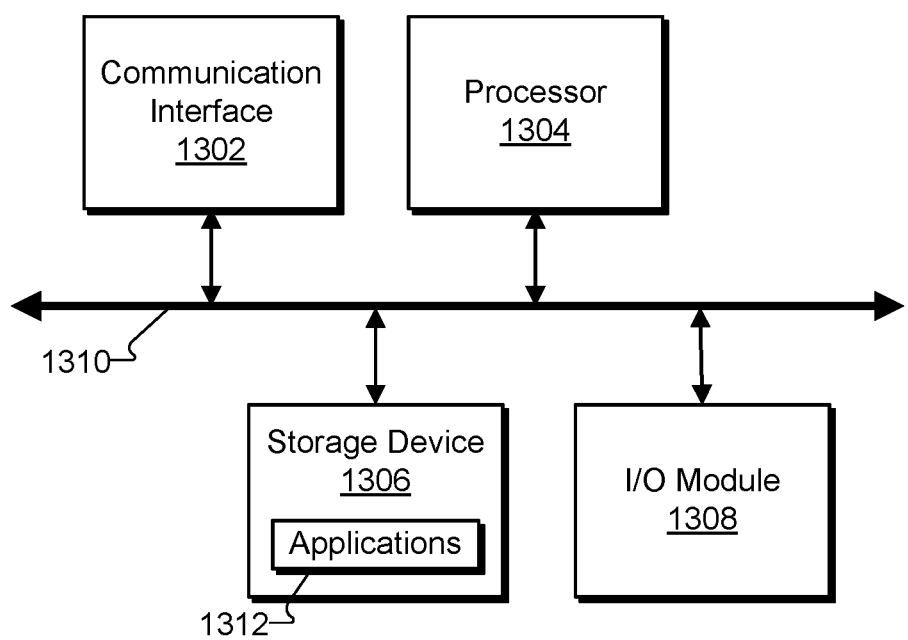
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. One or more I/O modules may be used to receive input for a single virtual experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with facilities 102 through 108 of system 100. Likewise, storage facility 110 of system 100 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   generating, by a geospatial image processing system, based on multiple detections of an object of interest detected by a computer vision model in multiple, correlated images of a geospatial location captured from different camera viewpoints, user interface content that includes a visual indication of the detected object of interest superimposed at an object position on a view of the geospatial location;
   providing, by the geospatial image processing system, the user interface content for display in a graphical user interface view of a user interface; and
   providing, by the geospatial image processing system, by way of the user interface, a user interface tool configured to facilitate user validation of one or more of the multiple detections of the object of interest,
   wherein
      the multiple, correlated images of the geospatial location are a filtered set of images of the geospatial location in which each image in the filtered set of images includes the detected object of interest,
      the filtered set of images of the geospatial location comprises multiple street-level images of the geospatial location in which the object of interest is detected, and
      the user interface content includes a plurality of partial image portions extracted from the multiple street-level images of the geospatial location in which the object of interest is detected, the plurality of partial image portions depicting the multiple detections of the object of interest detected by the computer vision model from the different camera viewpoints.

2. The method of claim 1, further comprising:
   receiving, by the geospatial image processing system, by way of the user interface tool of the user interface, user input indicating a confirmation or a rejection of one or more of the multiple detections of the object of interest;
   updating, by the geospatial image processing system, metadata associated with the filtered set of images based on the confirmation or the rejection; and
   training, by the geospatial image processing system, the computer vision model based on the updated metadata.

3. The method of claim 1, wherein:
   the view of the geospatial location comprises a map view of the geospatial location;
   the visual indication of the detected object of interest is superimposed at the object position on the map view of the geospatial location; and
   the user interface content further includes visual indications of the different camera viewpoints, from which the multiple street-level images of the geospatial location were captured, superimposed at different camera positions on the map view.

4. The method of claim 1, wherein:
   the view of the geospatial location comprises a street view of the geospatial location; and
   the visual indication of the detected object of interest is superimposed at the object position on the street view of the geospatial location.

5. The method of claim 1, wherein:
   the view of the geospatial location comprises a map view of the geospatial location; and
   the visual indication of the detected object of interest is superimposed at the object position on the map view of the geospatial location.

6. The method of claim 1, wherein the providing of the user interface tool configured to facilitate user validation of one or more of the multiple detections of the object of interest comprises:
   receiving, by way of the user interface, user input selecting a partial image portion included in the plurality of partial images portions; and
   providing, in response to the user input the partial image portion, a menu of selectable options comprising
      a confirmation option selectable by a user to confirm one of the multiple detections of the object of interest that is represented by the partial image portion, and
      a rejection option selectable by the user to reject the one of the multiple detections of the object of interest that is represented by the partial image portion.

7. The method of claim 1, wherein the providing of the user interface tool configured to facilitate user validation of one or more of the multiple detections of the object of interest comprises:
   receiving, by way of the user interface, user input selecting the visual indication of the detected object of interest; and
   providing, in response to the user input selecting the visual indication of the detected object of interest, a menu of selectable options comprising a confirmation option selectable by a user to confirm one or more of the multiple detections of the object of interest, and a rejection option selectable by the user to reject one or more of the multiple detections of the object of interest.

8. A system comprising:
at least one physical computing device configured to:
generate, based on multiple detections of an object of interest detected by a computer vision model in multiple, correlated images of a geospatial location captured from different camera viewpoints, user interface content that includes a visual indication of the detected object of interest superimposed at an object position on a view of the geospatial location;
provide the user interface content for display in a graphical user interface view of a user interface; and
provide, by way of the user interface, a user interface tool configured to facilitate user validation of one or more of the multiple detections of the object of interest,
wherein
the multiple correlated images of the geospatial location are a filtered set of images of the geospatial location in which each image in the filtered set of images includes the detected object of interest,
the filtered set of images of the geospatial location comprises multiple street-level images of the geospatial location in which the object of interest is detected, and
the user interface content includes a plurality of partial image portions extracted from the multiple street-level images of the geospatial location in which the object of interest is detected, the plurality of partial image portions depicting the multiple detections of the object of interest detected by the computer vision model from the different camera viewpoints.

9. The system of claim 8, the at least one physical computing device further configured to:
receive, by way of the user interface tool of the user interface, user input indicating a confirmation or a rejection of one or more of the multiple detections of the object of interest;
update metadata associated with the filtered set of images based on the confirmation or the rejection; and
train the computer vision model based on the updated metadata.

10. The system of claim 8, wherein:
the view of the geospatial location comprises a map view of the geospatial location;
the visual indication of the detected object of interest is superimposed at the object position on the map view of the geospatial location; and
the user interface content further includes visual indications of the different camera viewpoints, from which the multiple street-level images of the geospatial location were captured, superimposed at different camera positions on the map view.

11. The system of claim 8, wherein:
the view of the geospatial location comprises a street view of the geospatial location; and
the visual indication of the detected object of interest is superimposed at the object position on the street view of the geospatial location.

12. The system of claim 8, wherein:
the view of the geospatial location comprises a map view of the geospatial location; and the visual indication of the detected object of interest is superimposed at the object position on the map view of the geospatial location.

13. The system of claim 8, wherein the at least one physical computing device is configured to provide the user interface tool configured to facilitate user validation of one or more of the multiple detections of the object of interest by:
receiving, by way of the user interface, user input selecting a partial image portion included in the plurality of partial images portions; and
providing, in response to the user input the partial image portion, a menu of selectable options comprising
a confirmation option selectable by a user to confirm one of the multiple detections of the object of interest that is represented by the partial image portion, and
a rejection option selectable by the user to reject the one of the multiple detections of the object of interest that is represented by the partial image portion.

14. The system of claim 8, wherein the at least one physical computing device is configured to provide the user interface tool configured to facilitate user validation of one or more of the multiple detections of the object of interest by:
receiving, by way of the user interface, user input selecting the visual indication of the detected object of interest; and
providing, in response to the user input selecting the visual indication of the detected object of interest, a menu of selectable options comprising
a confirmation option selectable by a user to confirm one or more of the multiple detections of the object of interest, and
a rejection option selectable by the user to reject one or more of the multiple detections of the object of interest.

15. A non-transitory computer-readable medium storing instructions executable by a processor of a computing device to:
generate, based on multiple detections of an object of interest detected by a computer vision model in multiple, correlated images of a geospatial location captured from different camera viewpoints, user interface content that includes a visual indication of the detected object of interest superimposed at an object position on a view of the geospatial location;
provide the user interface content for display in a graphical user interface view of a user interface; and
provide, by way of the user interface, a user interface tool configured to facilitate user validation of one or more of the multiple detections of the object of interest,
wherein
the multiple, correlated images of the geospatial location are a filtered set of images of the geospatial location in which each image in the filtered set of images includes the detected object of interest,
the filtered set of images of the geospatial location comprises multiple street-level images of the geospatial location in which the object of interest is detected, and
the user interface content includes a plurality of partial image portions extracted from the multiple street-level images of the geospatial location in which the object of interest is detected, the plurality of partial image portions depicting the multiple detections of the object of interest detected by the computer vision model from the different camera viewpoints.

16. The non-transitory computer-readable medium of claim 15, wherein the instructions are further executable by the processor of the computing device to:
- receive, by way of the user interface tool of the user interface, user input indicating a confirmation or a rejection of one or more of the multiple detections of the object of interest;
- update metadata associated with the filtered set of images based on the confirmation or the rejection; and
- train the computer vision model based on the updated metadata.

17. The non-transitory computer-readable medium of claim 15, wherein:
- the view of the geospatial location comprises a map view of the geospatial location;
- the visual indication of the detected object of interest is superimposed at the object position on the map view of the geospatial location; and
- the user interface content further includes visual indications of the different camera viewpoints, from which the multiple street-level images of the geospatial location were captured, superimposed at different camera positions on the map view.

18. The non-transitory computer-readable medium of claim 15, wherein:
- the view of the geospatial location comprises a street view of the geospatial location; and
- the visual indication of the detected object of interest is superimposed at the object position on the street view of the geospatial location.

19. The non-transitory computer-readable medium of claim 15, wherein:
- the view of the geospatial location comprises a map view of the geospatial location; and
- the visual indication of the detected object of interest is superimposed at the object position on the map view of the geospatial location.

20. The non-transitory computer-readable medium of claim 15, wherein the instructions are executable by the processor of the computing device to provide the user interface tool configured to facilitate user validation of one or more of the multiple detections of the object of interest by:
- receiving, by way of the user interface, user input selecting the visual indication of the detected object of interest; and
- providing, in response to the user input selecting the visual indication of the detected object of interest, a menu of selectable options comprising
  - a confirmation option selectable by a user to confirm one or more of the multiple detections of the object of interest, and
  - a rejection option selectable by the user to reject one or more of the multiple detections of the object of interest.

* * * * *